(12) United States Patent
Takeuchi (10) Patent No.: US 6,805,447 B2
(45) Date of Patent: Oct. 19, 2004

(54) REAR PROJECTION DISPLAY DEVICE AND PROJECTING METHOD USED FOR THE SAME

(75) Inventor: Tadashi Takeuchi, Tokyo (JP)

(73) Assignee: NEC Viewtechnology Ltd., Tokyo (JP)

( * ) Notice: Subject to any disclaimer, the term of this patent is extended or adjusted under 35 U.S.C. 154(b) by 0 days.

(21) Appl. No.: 09/974,966

(22) Filed: Oct. 12, 2001

(65) Prior Publication Data

US 2002/0044263 A1 Apr. 18, 2002

(30) Foreign Application Priority Data

Oct. 13, 2000 (JP) ........................................ 2000-318239

(51) Int. Cl.[7] ........................ G03B 21/22; G03B 21/28; G03B 21/14; G03B 21/56; H04N 9/31
(52) U.S. Cl. ........................ 353/71; 353/74; 353/78; 353/79; 353/119; 348/744; 348/760; 348/836; 349/6; 359/443; 359/456; 359/460
(58) Field of Search ................................ 348/744, 760, 348/836, 843; 353/74, 77, 71, 79, 119, 30, 31, 37, 78; 349/6; 359/443, 456, 460

(56) References Cited

U.S. PATENT DOCUMENTS

| | | | | |
|---|---|---|---|---|
| 5,829,855 A | * | 11/1998 | Uchiyama | .................... 353/74 |
| 5,871,266 A | * | 2/1999 | Negishi et al. | ................ 353/98 |
| 6,147,801 A | * | 11/2000 | Goldenberg et al. | ......... 359/456 |
| 6,301,417 B1 | * | 10/2001 | Biscardi et al. | ............. 385/120 |
| 6,421,181 B1 | * | 7/2002 | Yoshida et al. | ............. 359/619 |
| 6,513,935 B2 | * | 2/2003 | Ogawa | ......................... 353/37 |
| 2002/0057421 A1 | * | 5/2002 | Kurematsu et al. | ............ 353/74 |

FOREIGN PATENT DOCUMENTS

| | | | | |
|---|---|---|---|---|
| JP | 4-107521 | 4/1992 | ........... G02B/27/18 |
| JP | 5-88264 | 4/1993 | ........... G03B/21/62 |

* cited by examiner

Primary Examiner—Rodney Fuller
Assistant Examiner—Melissa Koval
(74) Attorney, Agent, or Firm—Sughrue Mion, PLLC

(57) ABSTRACT

A flat mirror for folding an optical path in a casing of a rear projection television is arranged in the casing on not the side of a screen but a rear or upper side of the casing. In order to direct an optical path of an image projection to a flat mirror on a rear or upper side of the casing, a plurality of focusing mirrors, with which a light beam can be directed at a large angle with respect to a normal line of the screen and can focus an image through a shorter distance compared with a conventional lens system, are used. Since the light beam projected by the focusing mirrors is directed at high angle and reflected by the rear or upper side flat mirror in the casing, the light beam is focused on the screen provided on a front side of the casing.

5 Claims, 11 Drawing Sheets

REAR PROJECTION DISPLAY DEVICE AND PROJECTING METHOD USED FOR THE SAME

BACKGROUND OF THE INVENTION

1. Field of the Invention

The present invention relates to a rear projection television or rear projection display device and a projecting method thereof and, particularly, to a rear projection display device for enlarging and projecting an image on an image display element onto a projection screen.

2. Description of the Prior Art

Figure 1:
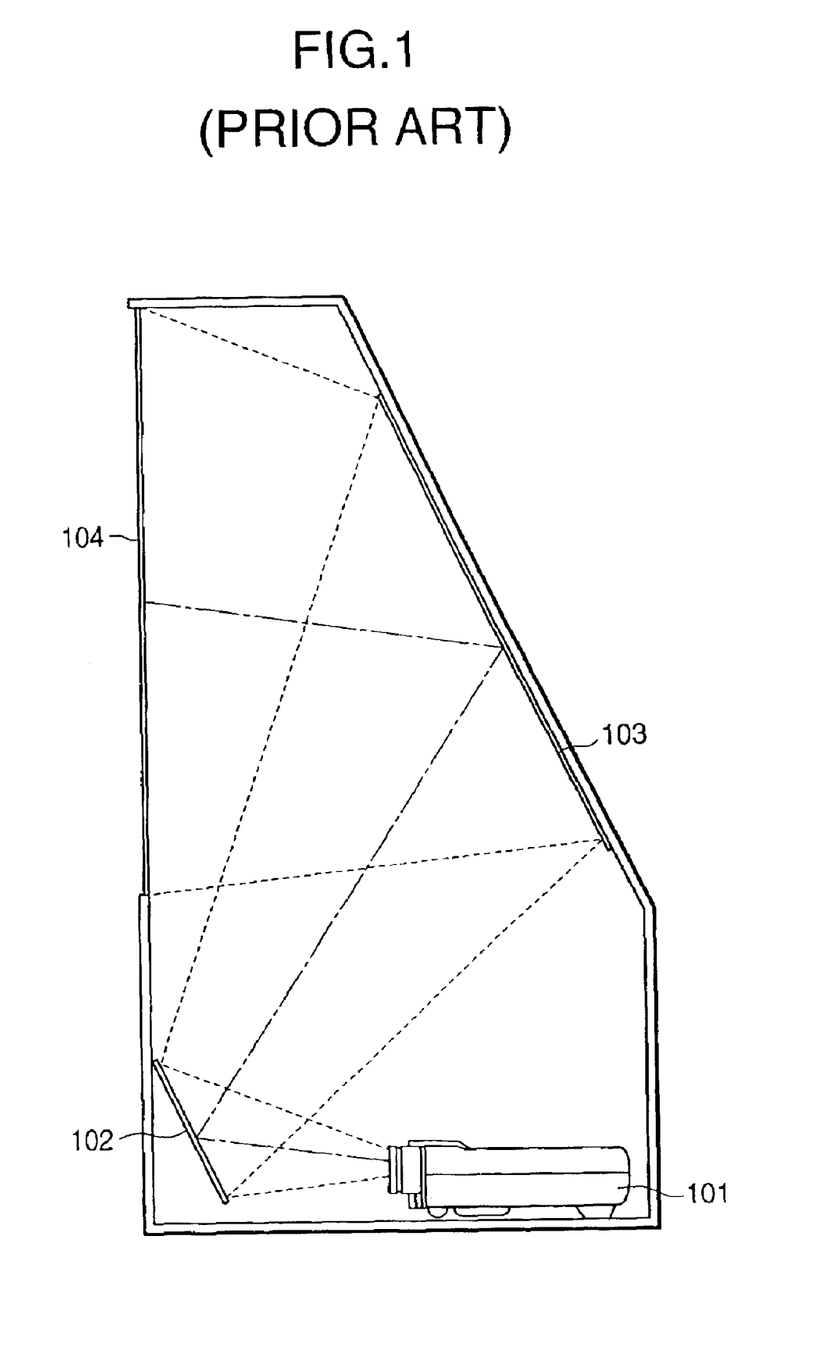
FIG. 1 is a cross sectional side view of a first example of a conventional rear projection television, showing an inner construction thereof.

Conventional rear projection display devices will be described with reference to FIG. 1 to FIG. 3. FIG. 1 is a cross section of a conventional rear projection television, showing its inner construction. As shown in FIG. 1, a light beam emitted from a projector 101 provided on a rear portion of a bottom plate of a casing of the rear projection television is reflected by a first flat mirror 102 provided in a lower front portion of the casing and, then, a second flat mirror 103 provided on a rear wall of the casing, and, finally, focused on a projection screen 104 provided in a front plate of the casing.

Figure 2:
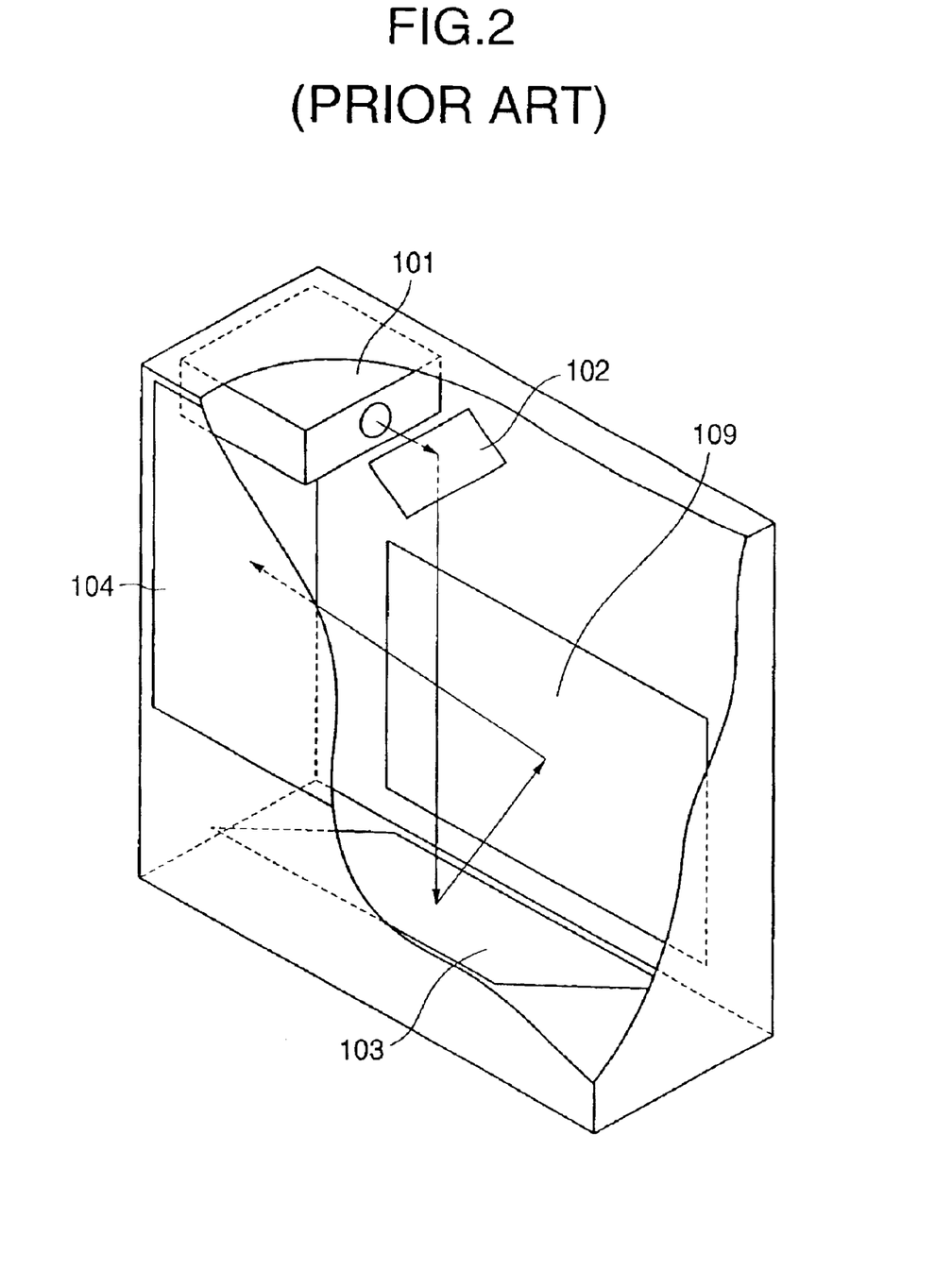
FIG. 2 is a cross sectional side view of a second example of a conventional rear projection television, showing an inner construction thereof.

FIG. 2 is a partially cross-sectioned perspective view showing an inner construction of another conventional rear projection display device. As shown in FIG. 2, a light beam emitted from a projector 101 provided on an upper plate of a casing of the conventional device is reflected down by a first flat mirror 102, reflected rearward by a second flat mirror 103 and, then, reflected forward by a third flat mirror 109 onto a projection screen 104 provided in a front plate of the casing. In FIG. 2, thickness, that is, depth size, of the device is reduced by increasing the number of reflections of the light beam projected from the projector 101. A rear projection display device of the above-stated type is disclosed in, for example, JP H4-107521A.

Figure 3:
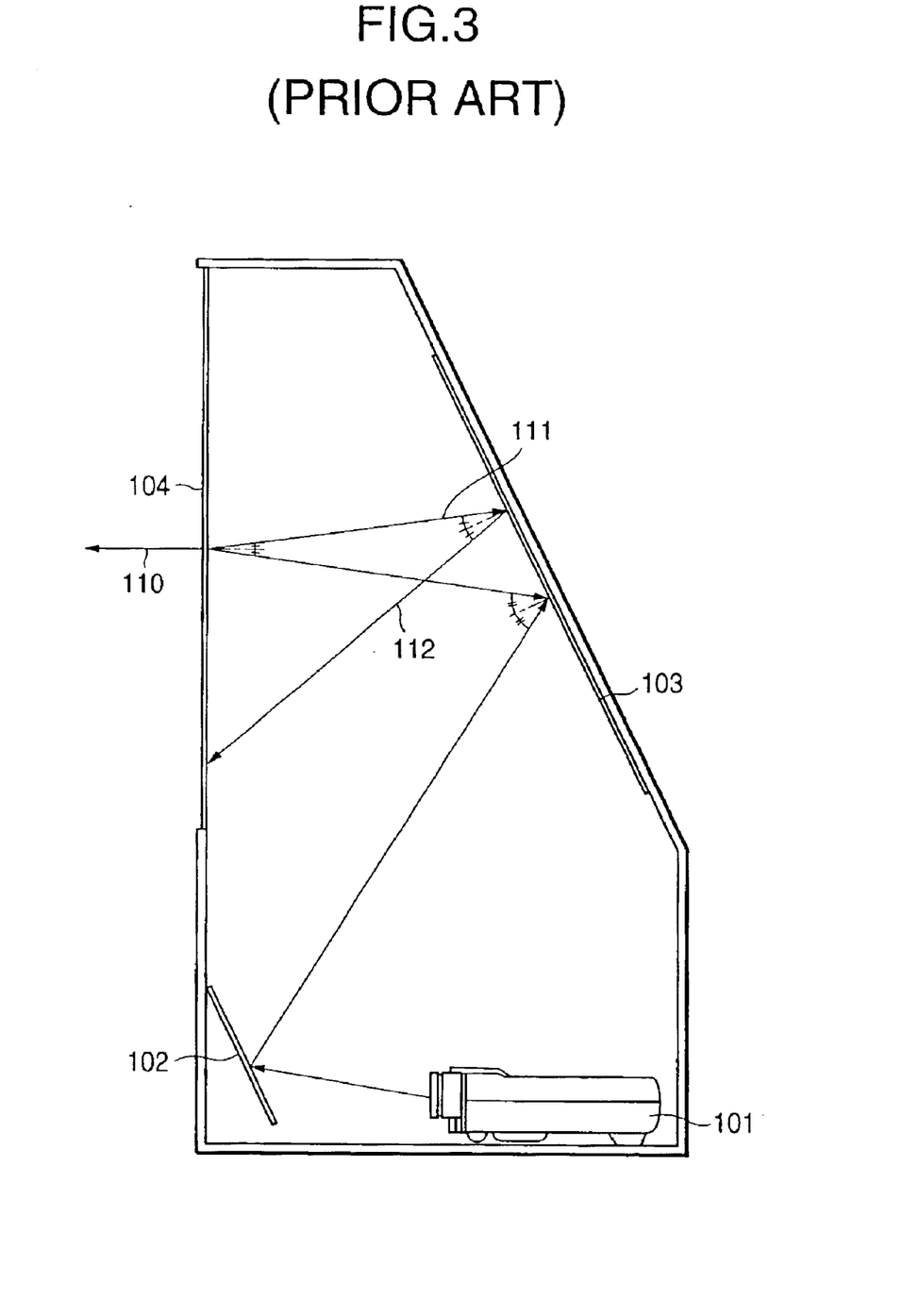
FIG. 3 is a cross sectional side view of a conventional rear projection television, illustrating a generation of stray light within the conventional rear projection television.

FIG. 3 illustrates a generation of stray light in a conventional rear projection display device such as shown in FIG. 2. In FIG. 3, a light beam, which is emitted from a projector 101 and reflected onto a projection screen 104 by flat mirrors 102 and 103, is partially reflected by a surface of the projection screen 104 at a time when the light beam is incident obliquely on the projection screen. The light portion 111 reflected by the projection screen 104 is reflected by the flat mirrors 103 and incident again on the projection screen 104 as a light beam 112. The light beam 112 appears on the screen as a stray light, causing a ghost image on the screen.

Similarly, an external light beam such as light from a room illumination lamp entered into the casing may generates stray light with which a ghost image may also appear on the screen.

In such conventional rear projection display device as mentioned above, there are many problems.

A first one of them is that a space for receiving one of the flat mirrors must be provided in a portion of the casing of the rear projection television below the screen thereof. Such space may form a skirt portion, which is undesirable in appearance of the rear projection display device and is an obstacle to reduction of the size of the rear projection display device.

A second problem is that the length of the conventional rear projection television in depth becomes large due to long projection light path of the rear projection television. That is, in the conventional projection using projection lenses, the projection path length tends to become large due to the design of the lens. Even if the light path is shortened by folding the light path by using a plurality of reflection mirrors, the size of the rear projection television in depth becomes similar to that of a CRT monitor at best.

A third problem is that stray light, which is a cause of ghost image on the screen, is generated by reflection of a light beam at an incident surface of the screen and/or external light entering into the rear projection television.

A fourth problem is that, when a large number of reflection mirrors are used, the luminance of an image on the screen is degraded due to reflectivity problems of the respective reflection mirrors.

A fifth problem is that, due to the presence of the skirt portion of the conventional rear projection television, it is impossible to manufacture a multi rear projection television including a plurality of rear projection display devices arranged in matrix.

In manufacturing such multi rear projection television, it is important to make junctures between screen portions inconspicuous. Therefore, if the rear projection television has a skirt portion, it is impossible to manufacture the multi rear projection television. In order to solve this problem, it is general in the conventional multi rear projection television to project light beams emitted by projectors onto a screen without folding them by using reflection mirrors. In such case, there are new problems of necessity of large scale construction in setting a multi rear projection television, increase of cost for manufacturing the multi rear projection television, impossibility of mass production of the multi rear projection television and necessity of a room for housing the multi rear projection television, which is large in depth enough to obtain a required projection length without using the folding of light beam.

As means for solving some of these new problems, JP H5-88264A discloses a construction of a rear projection television in which a screen is provided on a whole front surface of a casing thereof, a projector is arranged such that light emitted therefrom is directly directed to an upper plate of the casing and a large size reflection mirror is provided obliquely on a lower surface of the upper plate to reflect the light emitted from the projector onto the screen. With this construction of the rear projection television, there is no skirt portion provided in the casing. However, since the large reflection mirror is provided obliquely on the side of the upper plate such that an incident angle of light to the screen becomes not substantially large, the size of the casing in depth is reduced to only about a half to one third the size, that is, a diagonal size, of the screen at best. Further, since the projector is unnaturally arranged to project light upward, the maintenance of the rear projection television becomes troublesome.

SUMMARY OF THE INVENTION

An object of the present invention is to provide a rear projection television having a size, which is reduced by removing a skirt portion thereof and reducing a depth length thereof, and a projection method for use in the rear projection television.

Another object of the present invention is to provide a rear projection television capable of improving the quality of image projected onto a screen thereof by removing stray light projected onto a screen, with which a ghost image is produced on the screen, and a projection method for use in the rear projection television.

Further object of the present invention is to provide a rear projection television capable of improving luminance of an image on a screen by reducing the number of flat reflection mirrors and a projection method for use in the rear projection television.

In a rear projection television according to the present invention, an end side flat reflection mirror in a casing thereof is arranged in the vicinity of an upper edge portion of a projection screen to reflect light beam emitted from a projector to a whole rear surface of the screen. The rear projection television according to the present invention is featured by that an optical axis of the light beam projected up to the end side flat reflection mirror and the screen is slanted to the screen to gradually reduce a distance between the optical axis and the screen.

In such rear projection television, it is a feature that a focusing optical system constructed with a plurality of focusing mirrors for expanding and projecting the light beam is provided between the end side reflection mirror and the projector. The focusing optical system may be constructed with a first mirror for reflecting a light from an image display element for forming an image information, a second mirror for reflecting a light reflected by the first mirror, a third mirror for reflecting light reflected by the second mirror and a fourth mirror for reflecting light reflected by the third mirror. It is preferable to arrange the first to fourth mirrors such that the light reflected by the fourth mirror is incident on the end side flat reflection mirror.

The rear projection television according to the present invention is featured by further comprising a flat reflection mirror provided on a rear wall of the casing such that the light beam from the projector is directed to the end side flat reflection mirror.

In the rear projection television according to the present invention, it is preferable that an angle of a surface of the end side flat reflection mirror with respect to a surface of the screen is in a range from 70 degrees to 120 degrees. Further, it is preferable that an angle of the optical axis of the light beam, which is reflected from a center of the end side flat reflection mirror and incident on the center of the screen, with respect to a center normal line of the screen is 45 degrees or more.

According to the present invention, the depth size of the casing of the rear projection television can be one fifth a diagonal size of the screen or smaller.

The projection screen of the present invention preferably has a laminated structure of a full reflection type Fresnel lens and a lenticular lens and, particularly, an optical axis of the Fresnel lens is positioned outside the screen.

The rear projection television according to the present invention has a final stage mirror for folding the optical path, which is provided on the side of an upper plate or on the bottom side plate of the casing, and the focusing optical system may be constructed with a plurality of lenses. Further, the image display element may be constructed with a liquid crystal panel, which displays an image by reflecting and blocking light from a light source.

Alternatively, the image display element may be constructed with a DMD (Digital Micromirror Device), which is a collection of micro reflection mirrors for displaying an image by reflecting a light beam from a light source in an arbitrary direction.

A projection method of the rear projection television, according to the present invention, is featured by that the focusing optical system for enlarging and projecting an image on the image display element and focusing it on the projection screen and reflection mirrors are combined and arranged such that an optical axis of an incident light to a final one of the reflection mirrors is slanted to the screen to gradually reduce a distance between the optical axis and the screen.

Particularly, the present projection method is featured by that an incident angle of the light on the screen is 45 degrees or more. Further, the present projection method is featured by that a center of the focused image is different in position from the optical axis of the focusing optical system. Further, the projection method is featured by that the optical axis of the light beam reflected by one of the reflection mirrors, which is immediately preceding the final reflection mirror, is slanted to the screen to gradually reduce a distance between the optical axis and the screen.

DETAILED DESCRIPTION OF THE PREFERRED EMBODIMENTS

Figure 4:
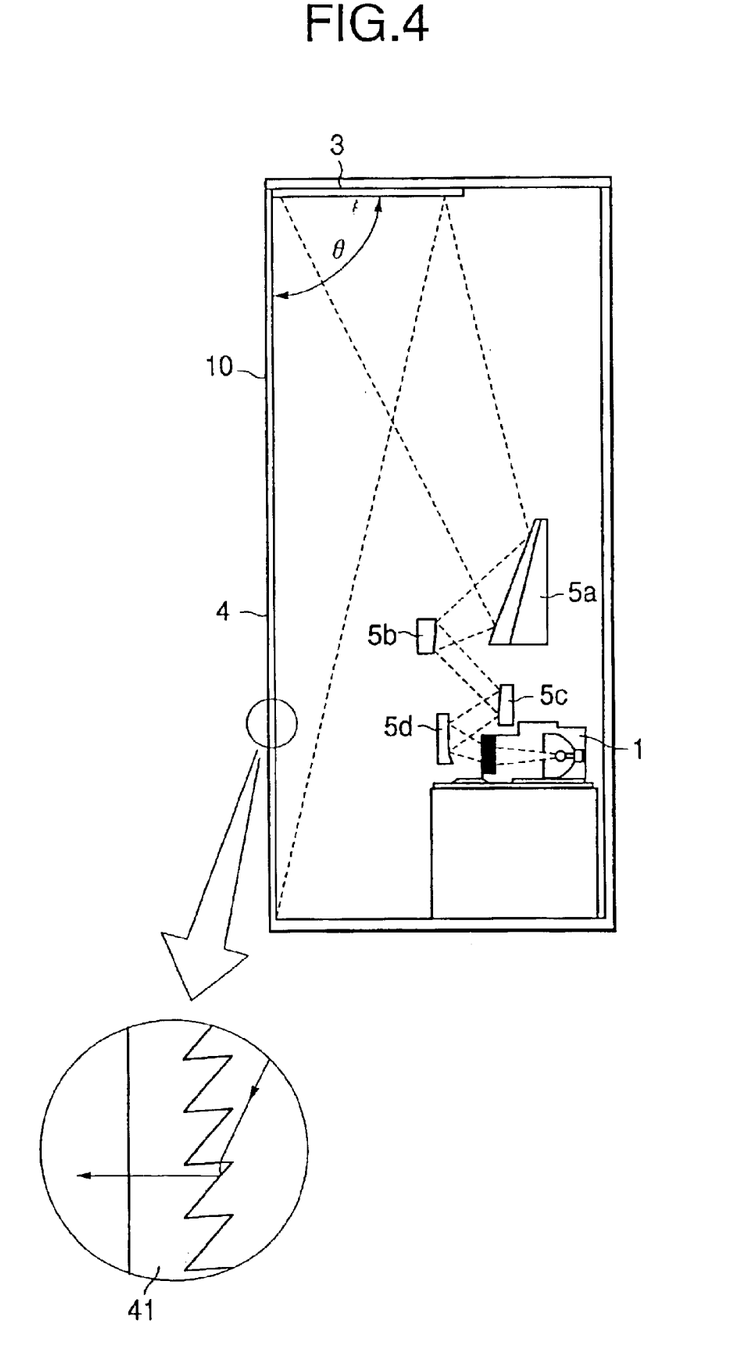
FIG. 4 is a cross sectional side view of a rear projection television according to a first embodiment of the present invention, showing an inner construction thereof.

A rear projection television according to a first embodiment of the present invention will be described with reference to FIG. 4. In FIG. 4, a projection screen 4 constitutes a front face of a casing 10 of the rear projection television. A projector 1, which uses a focusing optical system including a plurality of aspherical focusing mirrors 5a to 5d, is provided on the side of a bottom plate of the casing 10 and a flat mirror 3 is provided on a lower surface of an upper plate of the casing 10.

A light beam emitted by the projector 1 is directed up to the flat mirror 3 at an angle as high as 45° or more with respect to a normal line of the screen through the aspherical focusing mirrors 5d, 5c, 5b and 5a. The light beam is reflected to the projection screen 4 by the flat mirror 3 arranged in a plane orthogonal to a plane of the screen 4, so that an image of the light beam emitted by the projector 1 is finally focused on the screen 4.

The present invention is featured by that an optical axis of the light beam projected up to the flat mirror 3 is slanted to the screen 4 to gradually reduce a distance between the optical axis and the screen 4. In other words, the higher the horizontal level of the projected light beam is the smaller the distance between the optical axis of the projected light beam and the screen, as shown in FIG. 4.

Since the plane of the flat mirror 3 intersects the plane of the screen 4 at right angle, the projecting angle of the light beam projected toward the flat mirror 3 becomes equal to the incident angle of the focusing light beam on the screen 4. That is, the present invention is featured by that the depth size of the casing is reduced by arranging the optical system such that the incident angle of light on the screen becomes 45 degrees or more, contrarily to the conventional technical by which the incident angle of light on the screen is restricted. Further, the ghost problem caused by stray light incident on the screen is solved by making the incident angle of light on the screen larger than that in the conventional rear projection television, as to be described later.

In this embodiment, it is preferable that a full reflection type Fresnel lens 41 having an irregular inside surface shown in an enlarged scale in FIG. 4 is employed as the projection screen 4. More preferably, the screen 4 is a lamination of the Fresnel lens and a lenticular lens.

A rear projection television according to a second embodiment of the present invention will be described with reference to FIG. 5 and FIG. 6. In the second embodiment, an upper wall and a rear wall of a casing 10 are formed by a flat reflection mirror 3 and a flat reflection mirror 2, respectively. With the provision of the rear flat reflection mirror 2, a projector 1 is arranged such that it projects light onto the flat reflection mirror 2 through a focusing optical system including a plurality of aspherical focusing mirrors 5a to 5d.

Furthermore, the projector 1 is arranged such that light beam projected thereby is focused on the screen 4 forming the front side of the casing 10 through the flat mirror 2 and the flat mirror 3 provided on the rear and upper sides of the casing 10, respectively. That is, the flat mirror 2 is arranged such that a plane of the flat mirror 2 on the rear side of the casing 10 is in parallel to a plane of the screen 4 on the front side of the casing 10 and the flat mirror 3 is arranged such that it is orthogonal to the screen 4.

The projector 1 using a liquid crystal panel as the image display element will be described with reference to FIG. 5. The projector 1 is the so-called liquid crystal projector in which red (R), green (G) and blue (B) image lights are synthesized by a cross-prism 1b of the projector 1 and the synthesized color image is projected from the projector 1. A focusing optical system is constructed with aspherical focusing mirrors 5d to 5a in the order with the focusing mirror 5d being arranged in front of the projector 1 and the focusing mirror 5a reflecting the color image onto the flat reflection mirror 2, so that an optical path extends in a zigzag manner and the image light is guided upward while folded by reflections on the respective four focusing mirrors. The flat folding mirror 2 is provided in an upper portion of the rear side of the casing in a facing relation to the last focusing mirror 5a and the flat folding mirror 3 is provided on the upper side of the casing. Therefore, light emitted from the projector 1 is reflected and folded by the focusing mirrors 5d to 5a, the flat folding mirror 2 and the flat folding mirror 3, passes through the zigzag optical path and projected on the screen 4.

In the rear projection television according to the second embodiment of the present invention, in order to further reduce the depth size of the television, the image projecting system including the projecting and focusing mirrors each comprising an aspheric mirror, the flat folding mirror 2 and the flat folding mirror 3 is arranged between the projector 1 and the screen 4, as mentioned. Since the aspheric mirror can reflect light upward at large angle compared with a lens or a flat mirror, etc., the light can be expanded at high power within a short projecting optical path by using the aspherical projecting and focusing mirrors 5a to 5d. Further, with using the aspherical projecting and focusing mirrors 5a to 5d, the upward angle $\zeta$ of the projecting light (incident light Li) becomes larger compared with the case where a usual projecting lens is used. Therefore, the incident angle of light on the screen 4 becomes large and the flat mirrors and other parts are not interfered by the folding and reflection of the projected light from the aspheric mirrors and/or the incident light on the flat mirrors is not blocked by the aspheric mirrors. As a result, it becomes possible to substantially reduce the depth size of the rear projection television.

The screen 4 may be constructed with the Fresnel lens 7 and the lenticular lens 8, etc., as in the first embodiment and the light beam reflected by the flat mirror 3 is focused on the screen 4.

Figure 7:
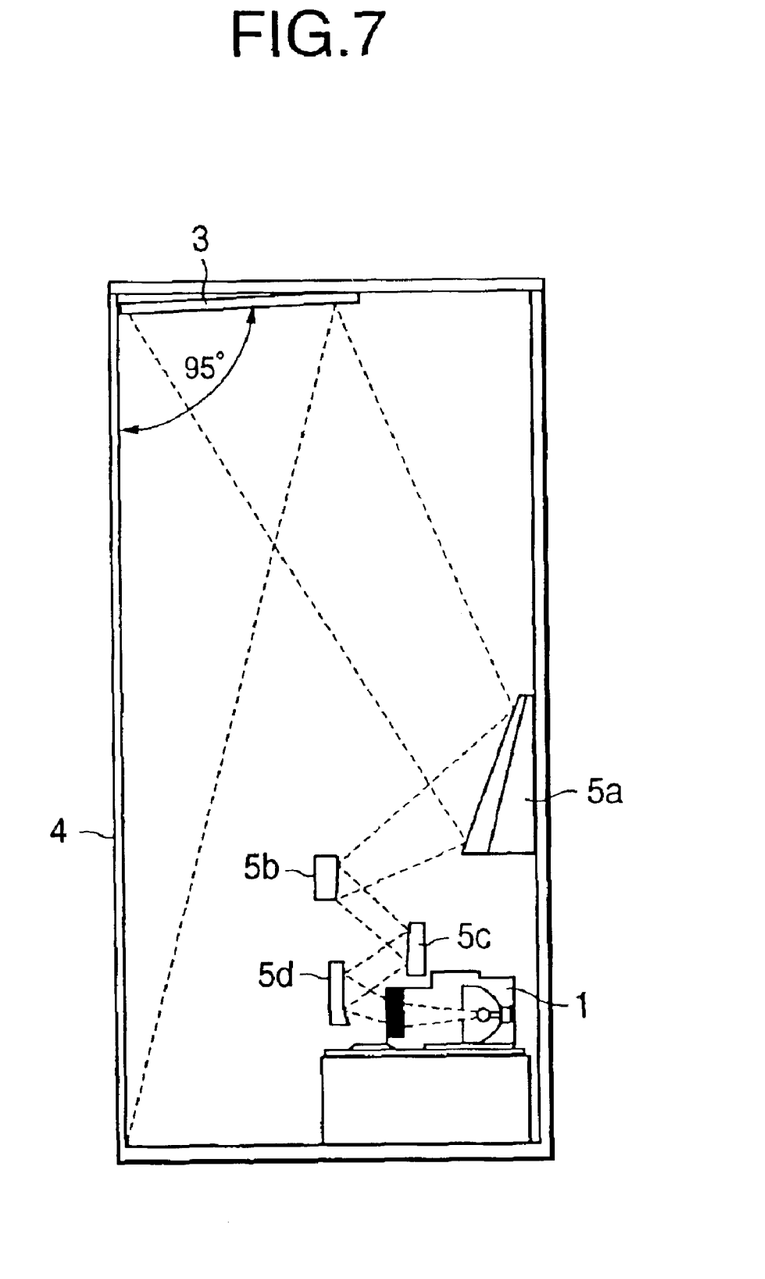
FIG. 7 is a cross sectional side view of a rear projection television according to a third embodiment of the present invention, showing an inner construction thereof.

A rear projection television according to a third embodiment of the present invention will be described with reference to FIG. 7. As shown in FIG. 7, a flat mirror 3 provided on a lower surface of an upper plate of a casing makes an angle of 95° with respect to a screen 4. A projector 1 and a focusing optical system including a plurality of aspherical focusing mirrors 5a to 5d are arranged in the casing of the rear projection television in a similar manner to the first embodiment shown in FIG. 4.

A light beam emitted from the projector 1 is reflected by the focusing mirrors 5d, 5c, 5b and 5a in the order toward the flat mirror 3 at an angle as large as 45 degrees or more with respect to a normal line of the screen 4. The projecting light beam containing an image information from the projector 1 is reflected by the flat mirror 3 and focused on the screen 4 on a front surface of the casing. Although the flat mirror 3 is mounted at an angle of 95 degrees with respect to the screen surface in FIG. 7, this angle may be changed within a range from 70 degrees to 120 degrees with the above mentioned effect.

Figure 8:
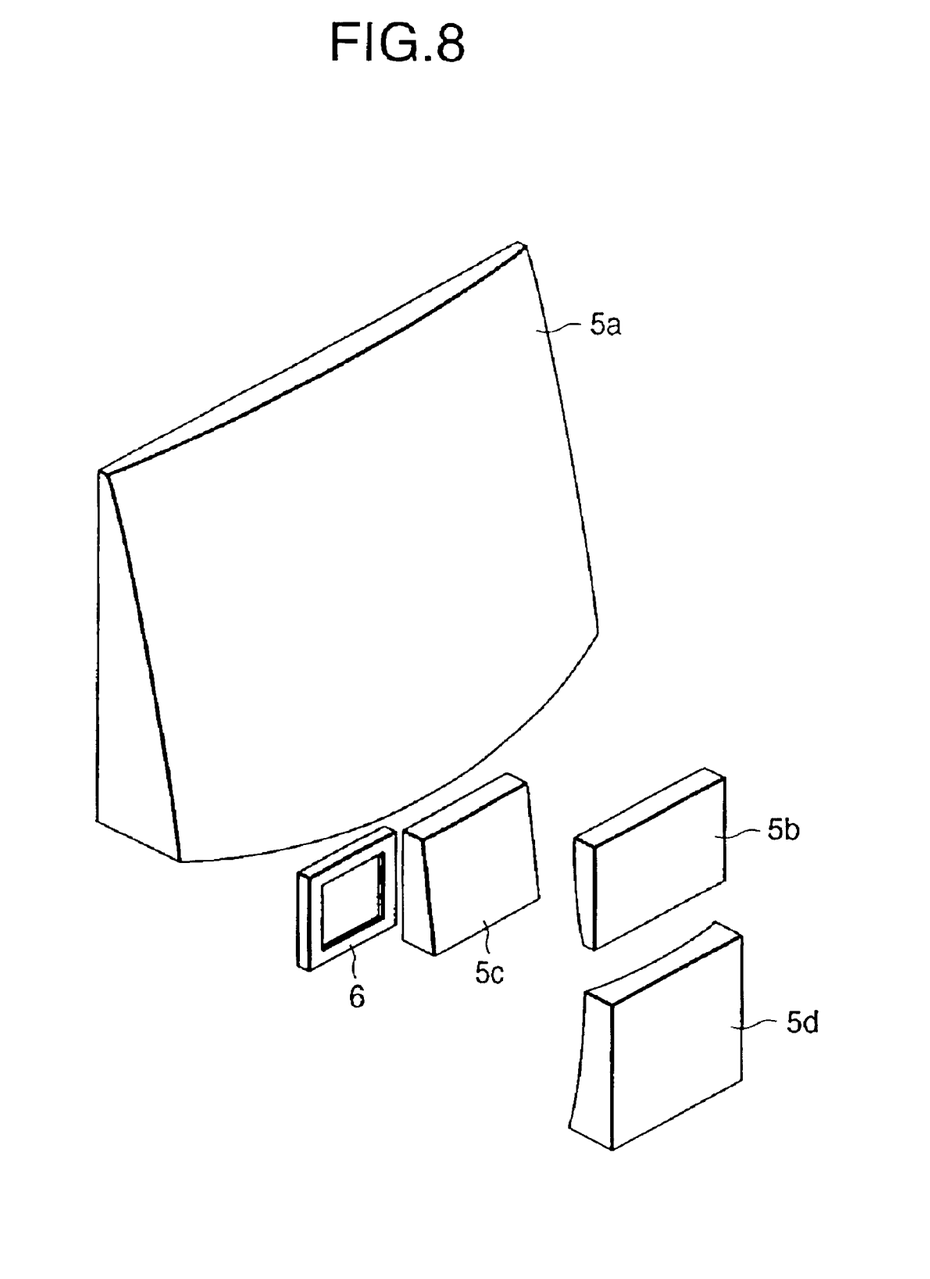
FIG. 8 shows a group of a plurality of focusing mirrors used in the respective embodiments of the present invention as focusing optical elements.

FIG. 8 illustrates the focusing mirrors used in the respective embodiments as the focusing optical part. As shown in FIG. 8, a light beam emitted by a projector, which is not shown, passes through an image display element 6 constructed with a liquid crystal panel or a DMD and is directed to a mirror 5d. The light beam reflected by the mirror 5d is further reflected by a mirror 5c, a mirror 5b and a mirror 5a sequentially in the order. The light beam reflected by the mirror 5a is directed to a flat mirror provided on a rear plate of a casing, which is not shown, or an upper plate of the casing and is reflected thereby to a screen, which is not shown.

Figure 9A:
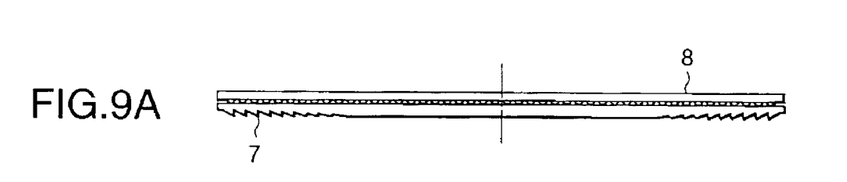
FIG. 9A is a plan view of a projection screen suitable for use in the respective embodiments of the present invention.
Figure 9B:
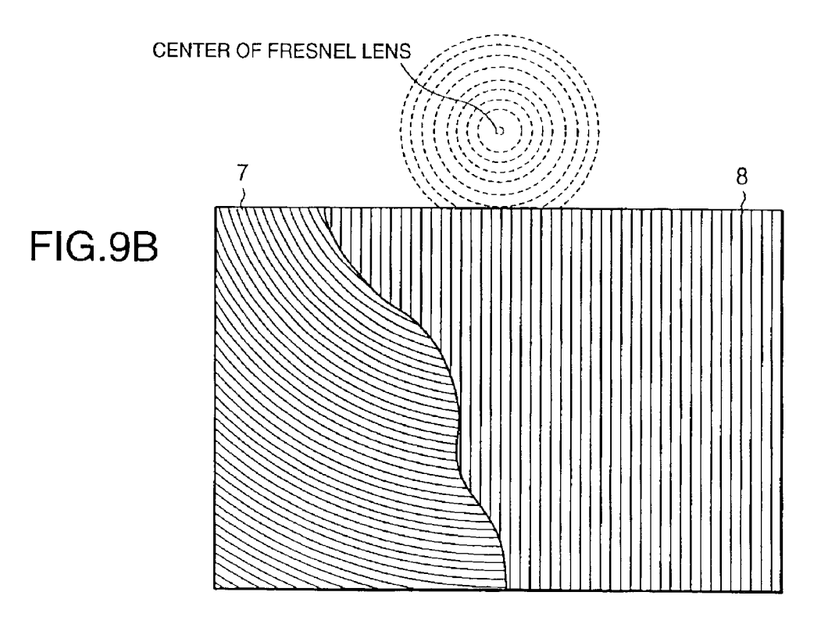
FIG. 9B is a front view of the projection screen shown in FIG. 9A.

FIG. 9A and FIG. 9B are a plan view and a front view of a screen suitable for use in the embodiments of the present invention, respectively. The screen is constructed with a lamination of a full reflection type Fresnel lens 7 and a lenticular lens 8. The full reflection Fresnel lens 7 is a thin lens having a surface formed with a plurality of coaxial stepwise portions each having curvature identical to a curvature of a thick lens to provide an optical characteristics of the thick lens. When such Fresnel lens is used, it is possible to realize a lens having a focal length, which is shorter than a diameter of the same lens. Such effect cannot be realized by a spherical lens. The lenticular lens 8 is a lens composed of a plurality of cylindrical lenses arranged on a flat plane and can improve the efficiency of division and collection of light and scattering of light.

Figure 5:
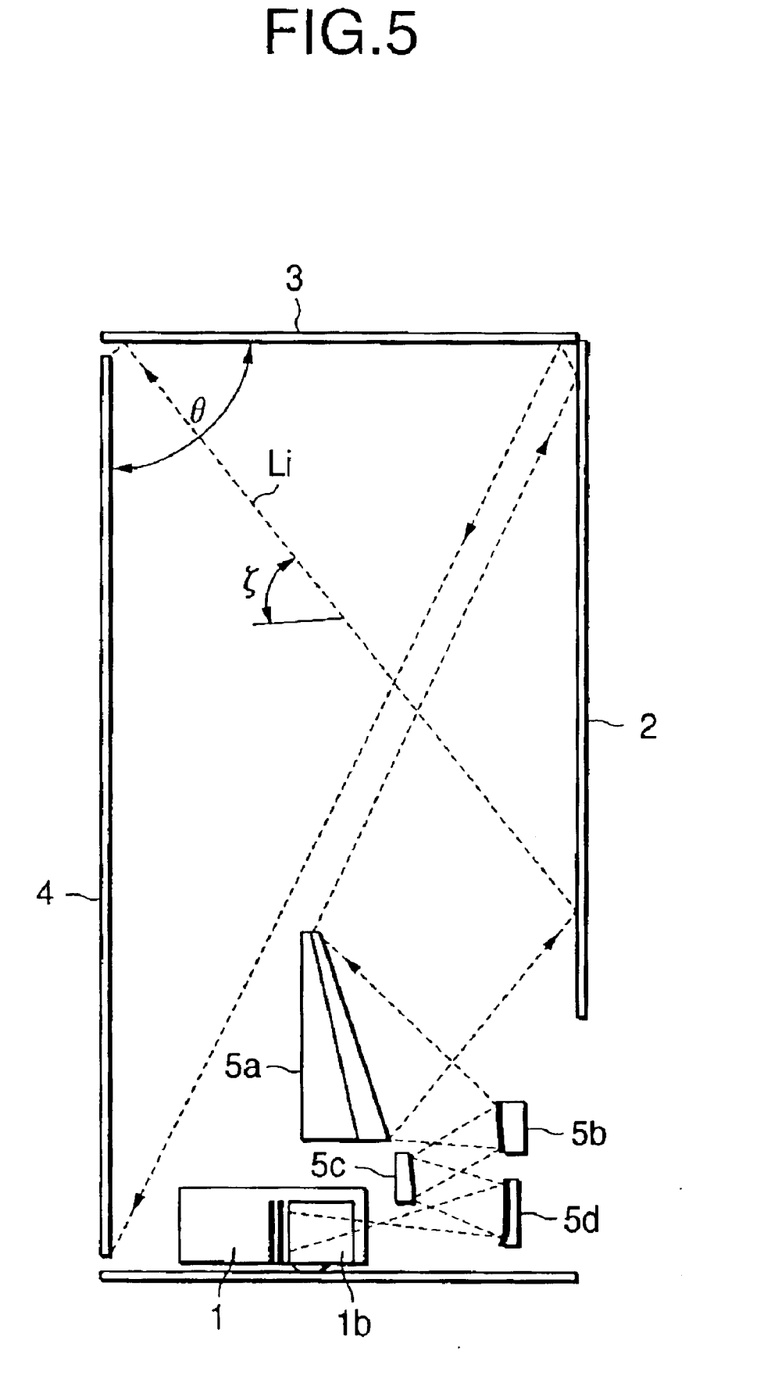
FIG. 5 is a cross sectional side view of a rear projection television according to a second embodiment of the present invention, showing an inner construction thereof.
Figure 6:
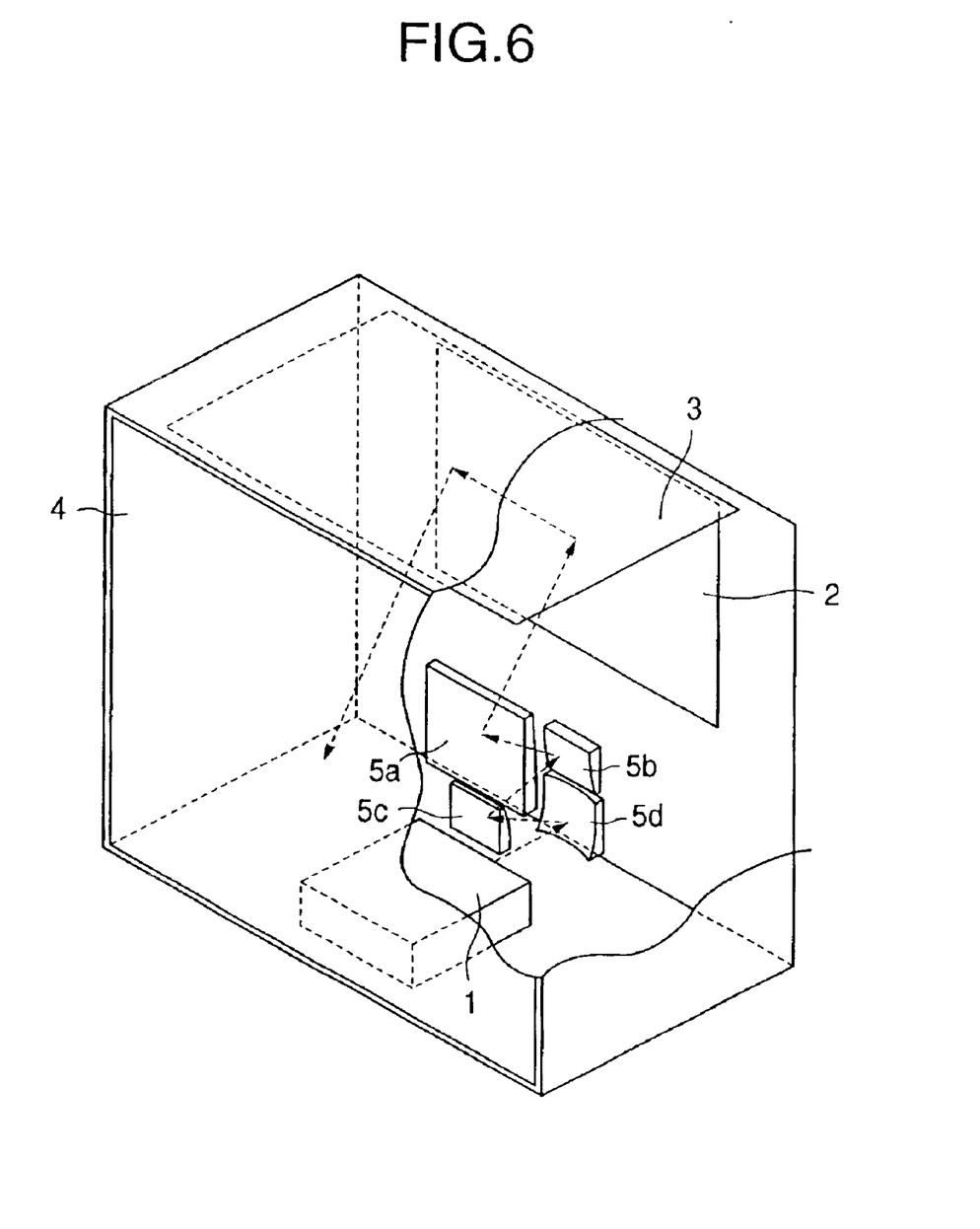
FIG. 6 is a cross sectional perspective view of the rear projection television according to the second embodiment of the present invention, showing the inner construction thereof.
Figure 10:
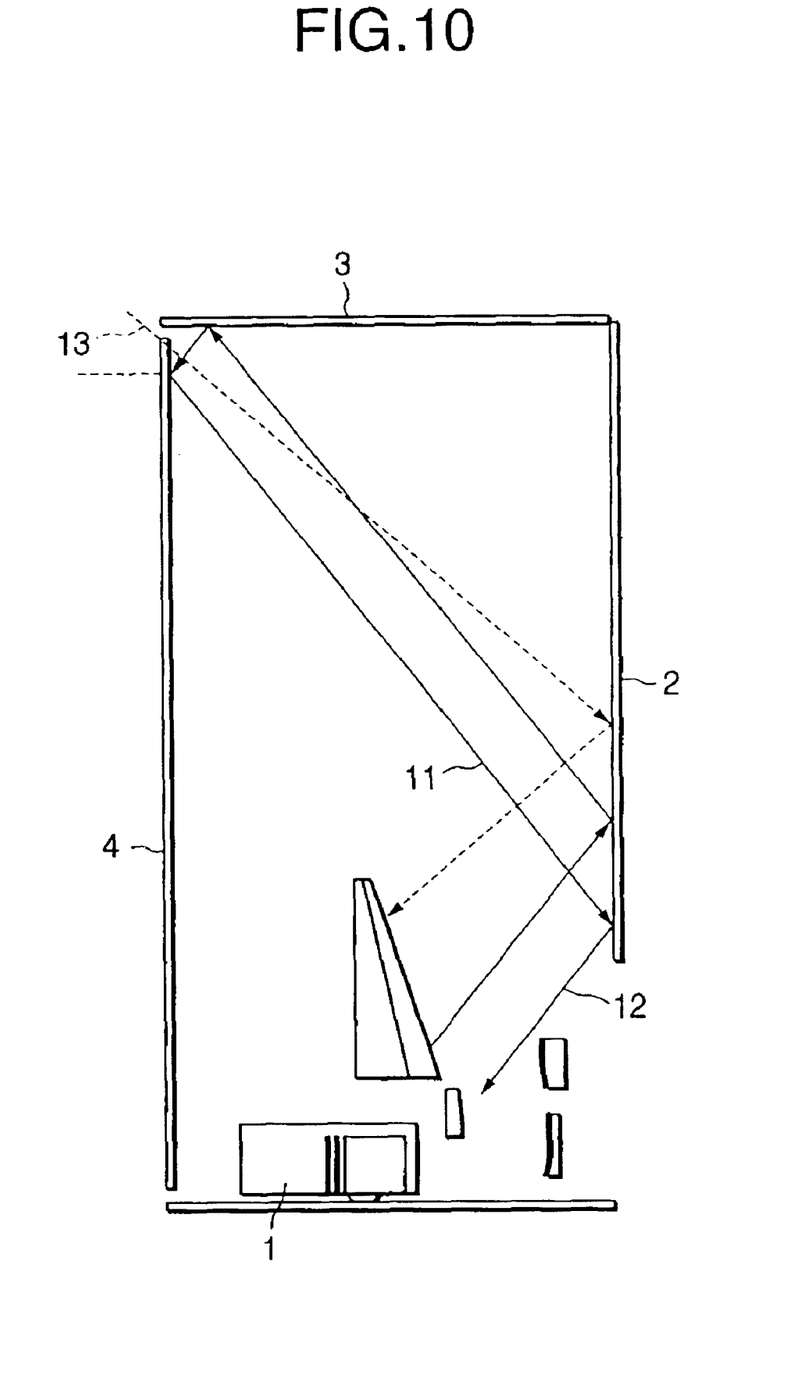
FIG. 10 illustrates an optical path of stray light generated in the rear projection television according to the present invention.

FIG. 10 is a trace of the stray light in the second embodiment shown in FIG. 5. As shown in FIG. 10, the light beam is generally directed upward at a large angle with respect to the normal line of the screen in the rear projection television according to each of the embodiments of the present invention. A portion of the light beam reflected by a surface of the screen 4 may be reflected again by the flat mirror 3. However, since the incident angle of the light beam from the focusing optical system on the flat mirror 3 is large, the light portion, which is reflected by the surface of the screen 4 and further reflected by the flat mirror 3, is directed outside the screen area. Therefore, it cannot be incident on the screen 4.

Similarly, a light beam 13 externally incident on the screen 4 is reflected by not the flat mirror 3 but the flat mirror 2 due to the inner construction of the rear projection television in which a light beam is generally directed upward at a large angle with respect to the normal line of the screen. A light beam 12, which is a portion of the light beam 13 reflected by the flat mirror 2, cannot be incident on the screen 4 depending upon the arranging position of the flat mirror 2. Therefore, there is no stray light incident on the screen 4.

Although the projecting and focusing mirrors 5a to 5d each composed of an aspherical lens are used in each of the embodiments of the present invention as the focusing optical system, the focusing optical system may be constructed with a combination of focusing mirrors and projecting lenses.

Figure 11A:
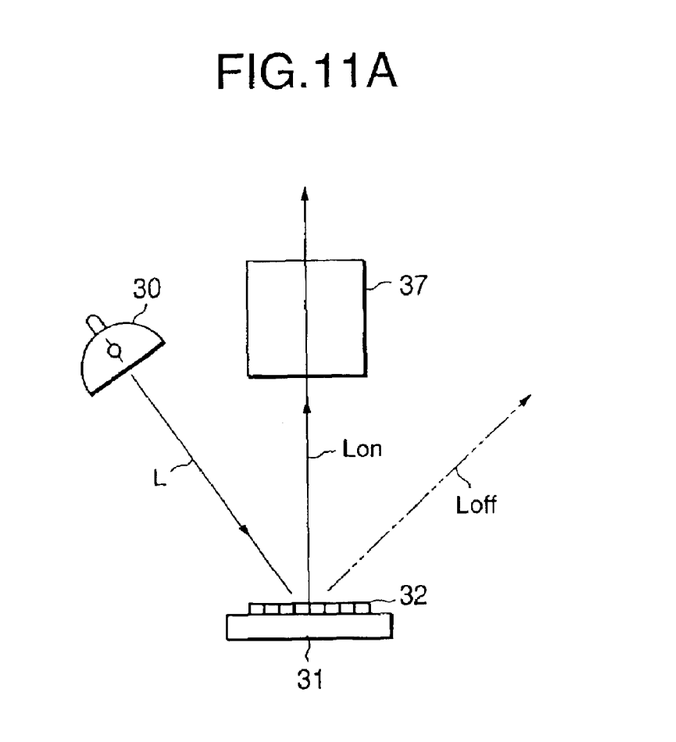
FIG. 11A schematically shows an image projector using a mirror array composed of a plurality of micro mirrors.
Figure 11B:
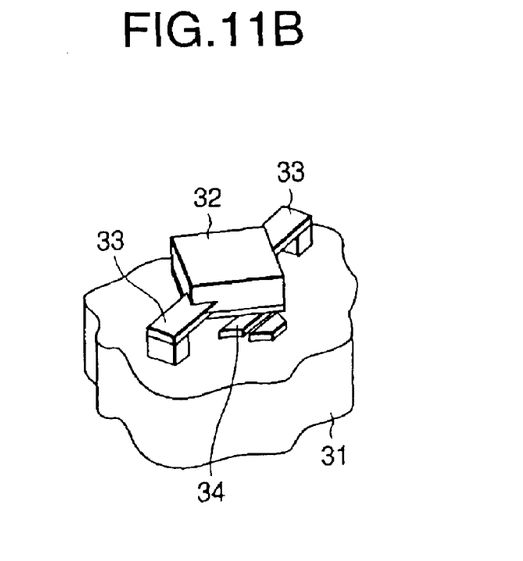
FIG. 11B is schematic perspective view of a micro mirror shown in FIG. 11A, showing a construction thereof.

Furthermore, although the projector has been described as the transparent type image projector using the liquid crystal panel, the projector may be a mirror array constructed with a group of micro mirrors 32 arranged in matrix on a surface of a silicon substrate 31 as shown in FIG. 11A and FIG. 11B. As shown in FIG. 11B, which is a perspective view of one of the micro mirrors 32 each forming a pixel. The micro mirror 32 is supported by a torsion beam 33, which is supported by the silicon substrate 31. The micro mirror 32 is rotated by electrostatic attraction force generated between paired address electrodes 34 provided on a surface of the silicon substrate 31. That is, the electrostatic attraction force is generated by applying a voltage between the address electrodes 34 and, by on-off switching the voltages applied between the address electrodes 34, the attitude of the micromirrors 32 are changed to change a reflecting direction of light L from a light source 30 to thereby produce an image. The image is projected by a projecting lens 37 as shown in FIG. 11A.

It should be noted that the respective embodiments described are preferred embodiments and can be modified in various ways within the scope of the present invention.

As will be clear from the above description, according to the rear projection television of the present invention and the fabrication thereof, the rear projection television can be made compact, since the front surface of the casing becomes the screen and the flat mirror for reflecting the light beam emitted from the projector is provided in at least the upper side of the casing so that there is no space provided in the casing of the rear projection television, which is necessary in the conventional rear projection television.

Furthermore, according to the rear projection television of the present invention and the fabrication method thereof, since the projecting optical path length of light emitted from the projector is substantially reduced compared with the conventional rear projection television, which uses projection lenses, by using the focusing mirrors, it is possible to reduce the whole optical path length. Further, it is possible to reduce the depth size of the television compared with the conventional rear projection television by using the focusing mirrors and the folding projection.

Moreover, according to the rear projection television of the present invention and the fabrication method thereof, it is possible to solve the stray light (ghost) problem on the screen since the projecting angle of light beam is larger than that in the conventional rear projection television.

Furthermore, according to the rear projection television of the present invention and the fabrication method thereof, the luminance of the image projected on the screen can be improved since the number of the reflection mirrors is small and the reducing rate of the total reflectivity of the mirrors can be kept small.

Furthermore, according to the rear projection television of the present invention and the fabrication method thereof, since the skirt portion of the rear projection television is removed and the front surface of the casing includes only the screen, it becomes possible to easily fabricate a large size multi rear projection television without substantial reconstruction and/or large scale construction work for an existence rear projection television, which is required when a multi rear projection television is fabricated on the basis of the conventional rear projection television.

What is claimed is:

1. A rear projection television comprising:

a casing having a projection screen, said projection screen constituting a front face of said casing;

a projector provided within said casing for emitting a light beam containing an image information; and an end side final stage reflection mirror provided within said casing in the vicinity of an end portion of said projection screen, wherein said end side final stage reflection mirror reflects said light beam emitted from said projector toward a whole rear surface of said screen, and said end side final stage reflection mirror is arranged such that an optical axis of said light beam incident on said end side reflection minor is slanted toward said screen to gradually reduce a distance between said optical axis and said screen, wherein a normal line of said end side reflection mirror is in parallel to a surface of said screen.

2. A rear projection television comprising:

a casing having a projection screen, said projection screen constituting a front face of said casing;

a projector provided within said casing for emitting a light beam containing an image information; and an end side final stale reflection mirror provided within said casing in the vicinity of an end portion of said projection screen, wherein said end side final stage reflection mirror reflects said light beam emitted from said projector toward a whole rear surface of said screen, and said end side final stage reflection mirror is arranged such that an optical axis of said light beam incident on said end side reflection mirror is slanted toward said screen to gradually reduce a distance between said optical axis and said screen, wherein an angle between a surface of said end side reflection mirror and said surface of said screen is in a range from 70 degrees to 120 degrees, wherein said screen has a construction including a flail reflection type Fresnel lens and a lenticular lens laminated on said Fresnel lens.

3. A rear projection television as claimed in claim 2, wherein an optical axis of said Fresnel lens is separated from a center of said screen.

4. A rear projection television as claimed in claim 3, wherein said optical axis of said Fresnel lens is outside of said screen.

5. A rear projection television comprising:

a casing having a projection screen, said projection screen constituting a front face of said casing;

a projector provided within said casing for emitting a light beam containing an image information; and an end side final stage reflection mirror provided within said casing in the vicinity of an end portion of said projection screen, wherein said end side final stage reflection mirror reflects said light beam emitted from said projector toward a whole rear surface of said screen, and said end side final stage reflection mirror is arranged such that an optical axis of said light beam incident on said end side reflection minor is slanted toward said screen to gradually reduce a distance between said optical axis and said screen, wherein an angle between a surface of said end side reflection mirror and said surface of said screen is in a range from 70 degrees to 120 degrees, further comprising a group of micro reflection mirrors for representing an image by reflecting an illumination light beam emitted from said light source to arbitrary directions.

\* \* \* \* \*